United States Patent [19]

Tonouchi et al.

[11] Patent Number: 5,608,906

[45] Date of Patent: Mar. 4, 1997

[54] MULTIPLE-TASK CONTROLLER HAVING A PLURALITY OF TASK MEMORY INPUT/OUTPUT DEVICES, INPUT/OUTPUT PROCESSING DEVICE, AND A PLURALITY OF TASKS CONTROLLED BY EXTERNAL DEVICES

[75] Inventors: Hiroshi Tonouchi; Masashi Furukawa, both of Nagano, Japan

[73] Assignee: Kabushiki Kaisha Sankyo Seiki Seisakusho, Nagano, Japan

[21] Appl. No.: 264,376

[22] Filed: Jun. 23, 1994

[30] Foreign Application Priority Data

Jun. 24, 1993 [JP] Japan ................................. 5-175882

[51] Int. Cl.⁶ .............................................. G06F 13/00
[52] U.S. Cl. ...................... 395/677; 395/309; 395/566; 395/825; 395/884
[58] Field of Search .................................. 395/650, 287, 395/839, 309, 375, 825, 884

[56] References Cited

U.S. PATENT DOCUMENTS

| | | | |
|---|---|---|---|
| 4,517,641 | 5/1985 | Pinheiro | 364/200 |
| 4,658,351 | 4/1987 | Teng | 364/200 |
| 4,779,194 | 10/1988 | Jennings et al. | 364/200 |
| 4,796,178 | 1/1989 | Jennings et al. | 364/200 |
| 4,893,234 | 1/1990 | Davidson et al. | 364/200 |
| 4,937,777 | 6/1990 | Flood et al. | 395/287 |
| 4,954,945 | 9/1990 | Inoue | 364/200 |
| 4,956,771 | 9/1990 | Neustaedter | 364/200 |
| 5,016,166 | 5/1991 | Van Loo et al. | 395/650 |
| 5,038,275 | 8/1991 | Dujari | 395/839 |
| 5,168,566 | 12/1992 | Kuki et al. | 395/650 |
| 5,265,249 | 11/1993 | Kumamoto | 395/650 |

FOREIGN PATENT DOCUMENTS

| | | |
|---|---|---|
| 0311007 | 4/1989 | European Pat. Off. |
| 3722084 | 1/1988 | Germany |

*Primary Examiner*—Thomas C. Lee
*Assistant Examiner*—Po C. Huang
*Attorney, Agent, or Firm*—Sughrue, Mion, Zinn, Macpeak & Seas

[57] ABSTRACT

A multiple-task controller includes a plurality of tasks which are controlled with first and second external devices: task memory input/output devices provided respectively for the tasks; a serial input/output processing section and a parallel input/output processing section which process signals transmitted between the first and second external device and the input/output processing section, and perform writing and reading operations with respect to the task memory input/output devices; and a task control section which applies commands written in the task input/output devices respectively to the tasks, and applies the states of process of the tasks respectively to the task memory input/output devices.

4 Claims, 2 Drawing Sheets

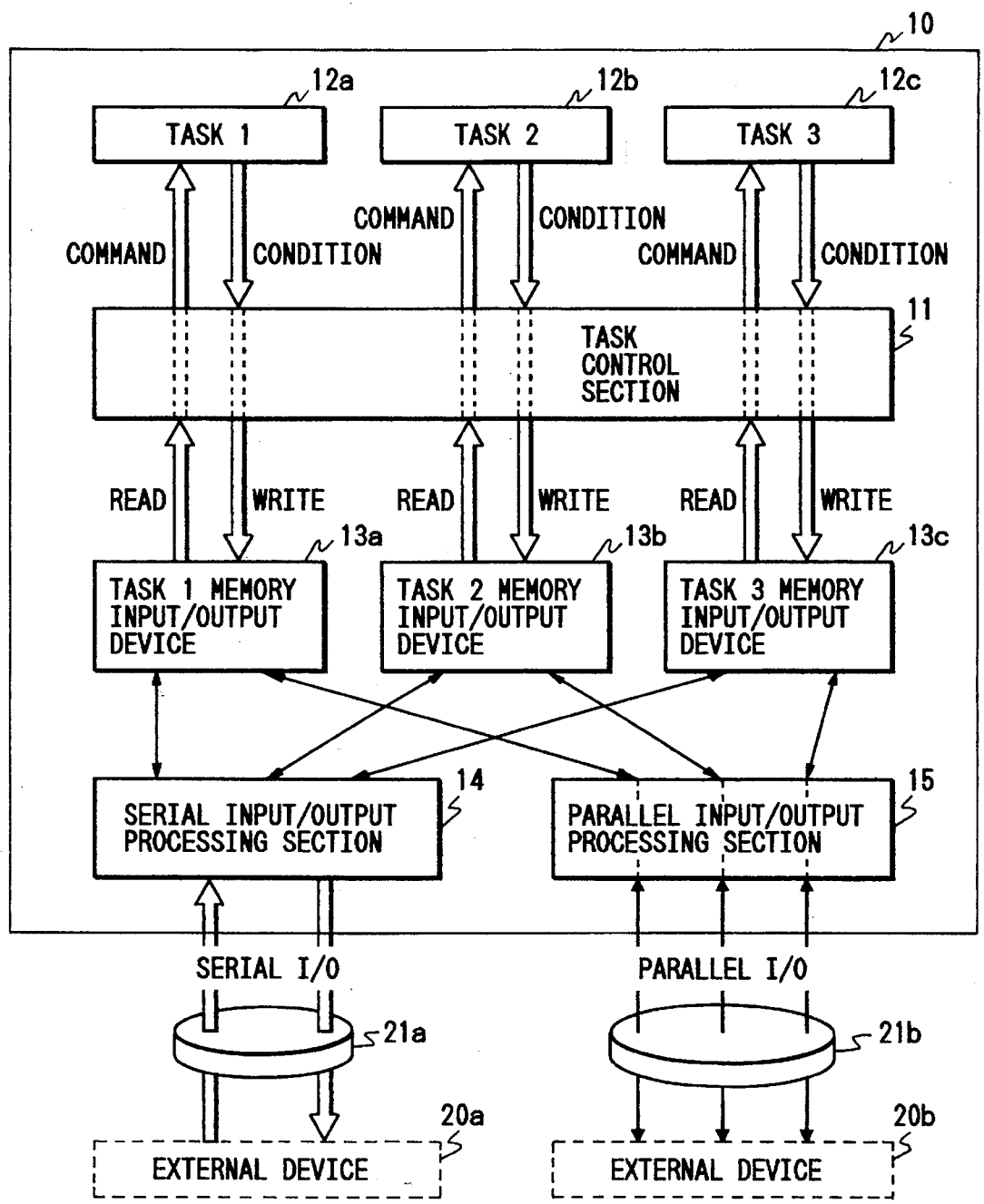

FIG. 2(a)

TASK INPUT SECTION m S$_{IX}$

| S$_{IX}$ | CONTENT |
|---|---|
| 1 | KIND OF TASK |
| 2 | AUTOMATIC-OPERATION POSSIBLE STATE |
| 3 | SYSTEM ERROR |
| 4 | TASK IN OPERATION |
| 5 | TASK CYCLE STOP |
| 6 | TASK STEP STOP |
| 7 | TASK HOLD STOP |
| 8 | |

FIG. 2(b)

TASK OUTPUT SECTION m S$_{OX}$

| S$_{OX}$ | CONTENT |
|---|---|
| 1 | ERROR RESET |
| 2 | TASK INITIAL START COMMAND |
| 3 | TASK CONTINUATION START COMMAND |
| 4 | TASK STEP START COMMAND |
| 5 | TASK CYCLE STOP COMMAND |
| 6 | TASK STEP STOP COMMAND |
| 7 | TASK HOLD COMMAND |
| 8 | |

FIG. 3

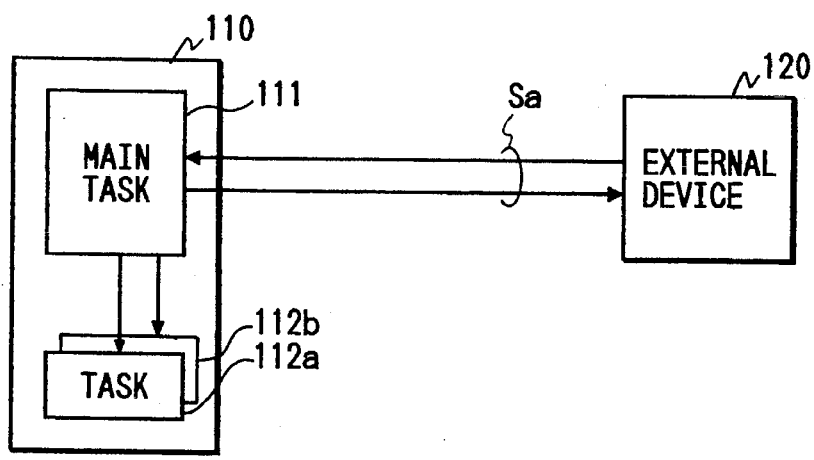

MULTIPLE-TASK CONTROLLER HAVING A PLURALITY OF TASK MEMORY INPUT/OUTPUT DEVICES, INPUT/OUTPUT PROCESSING DEVICE, AND A PLURALITY OF TASKS CONTROLLED BY EXTERNAL DEVICES

BACKGROUND OF THE INVENTION

1. Field of the Invention

This invention relates to a multiple-task controller which is able to control a plurality of tasks with an external device, and more particularly to a multiple-task controller in which an external device controls a plurality of tasks through memory input/output devices provided respectively for the tasks.

2. Related Art

A multiple-task controller of this type includes a plurality of tasks and a main task adapted to control those tasks. The tasks are controlled through the main task by an external device, so that their processes are performed, whereby the external device is controlled.

FIG. 3 shows a system comprising a conventional multiple-task controller 110 and an external device 120. The controller 110 includes a main task 111 and a plurality of tasks 112a, 112b, . . . . Those tasks 112a, 112b, . . . are so designed as to perform their own processes. The controller 110 is connected to the external device 120. A remote control signal Sa provided by the external device 120 is applied to the main task 111. A remote control signal Sa provided by the main task 111 is applied to the external device 120. Upon reception of the remote control signal Sa from the external device 120, the main task 111 decodes it and applies a command to a predetermined task 112n (where the suffix "n" means "arbitrary") to cause the latter to perform its own process. The result of the process is applied, as a remote control signal Sa, to the external device 120.

Let us consider the case where, in the above-described system, the external device 120 controls the tasks 112a, 112b, . . . . When, in this case, the external device 120 applies an instruction to the main task 111 by using a remote control signal Sa having predetermined contents, the main task 111 controls a given task 112n (where the suffix "n" means "optional") with a command of language level. The result of the process performed by the task 112n is applied to the main task 111 through a command of language level, and it is converted into a remote control signal Sa, which is applied to the external device 120.

As was described above, commands are used for the control between the main task 111 and the tasks 112a, 112b, . . . ; that is, commands of language level are used to start, stop and hold the tasks.

The commands used in the above-described conventional multiple-task controller are substantially equal in concept to those used in the general computer. Hence, the commands are rather difficult for a person to understand who has no general knowledge of the computer.

On the other hand, in the above-described multiple-task controller, more than ten different remote control signals Sa, such as those for start input and output, and pause input and output, are, in general, provided. Those remote control signals have been determined by the manufacturer. Therefore, for some user, all of them may be unnecessary, and for some other user, they are not adequate.

For instance, in a conventional multiple-task robot controller, commands are used for controlling the tasks.

The commands are the same as those used in the general computer; that is, commands of language level are used to start, stop and hold the tasks.

Hence, the system is rather difficult for a person to understand who has no general knowledge of the computer, and in practice it is rather difficult even for the robot operator to understand.

The object of the above-described conventional system is to divide a job into multiple tasks in the existing computer so that the job is achieved with high efficiency. In the existing computer system, it is unnecessary to stop a task which has been started or to start it again, and therefore the tasks are assigned according to the functions.

On the other hand, with a multiple-task robot controller for controlling robots or the like, its tasks are assigned to the devices, respectively, which are controlled by the controller, and therefore each task requires detailed control. Hence, the existing computer system is unsuitable and functionally insufficient as a controller for controlling robots or the like, and is insufficient in function.

SUMMARY OF THE INVENTION

Accordingly, an object of the invention is to eliminate the above-described difficulties accompanying a conventional multiple-task controller. More specifically, an object of the invention is to provide a multiple-task controller in which the tasks can be controlled with ease, and the remote control signals can be readily increased or decreased in the number of kinds.

According to an aspect of the present invention, a multiple-task controller including a plurality of tasks which are controlled with external devices comprising: task memory input/output devices provided respectively for the tasks; and input/output processing sections which process signals transmitted between the external devices and the input/output processing sections, and perform writing and reading operations with respect to the task memory input/output devices.

According to another aspect of the present invention, a multiple-task controller including a plurality of tasks which are controlled with external devices comprises: task memory input/output devices provided respectively for the tasks; input/output processing sections which process signals transmitted between the external devices and the input/output processing sections, and perform writing and reading operations with respect to the task memory input/output devices; and a task control section which applies commands written in the task input/output devices respectively to the tasks, and applies the states of process of the tasks respectively to the task memory input/output devices.

Further each of the task memory input/output devices comprises task input sections having bits to which predetermined control commands are assigned, for controlling the masks; and task output sections having bits to which predetermined state signals are assigned, for detecting the states of the tasks.

In the multiple-task controller of the invention, the plurality of task memory input/output devices are assigned to the plurality of tasks, respectively, and each of the external devices is able to use the task memory input/output devices to apply commands to the tasks and to read the states of process of the latter. Therefore, the controlling of the tasks, such as the starting and stopping of the latter, can be achieved readily as in the case where signal exchange is performed through input/output means.

In the controller of the invention, the results of the reading and writing operation with respect to the task memory input/output devices provided respectively for the tasks, being controlled by the task control section, are applied to the tasks. Therefore, the controlling of the tasks, such as the starting and stopping of the latter, can be achieved readily as in the case where signal exchange is performed through input/output means. Furthermore, the controller of the invention functions as in a controller in which one external device is provided for each task.

In the controller of the invention, writing data in the task output sections, and reading data from the task input sections can be achieved with respect to the input/output processing sections as in the case where data are written and read through ordinary input/output means. Hence, any one can understand the operation of the multiple-task controller without knowledge of the computer, and are able to operate the controller as required.

BRIEF DESCRIPTION OF THE DRAWINGS

FIG. 1 is a block diagram showing a multiple-task controller, which constitutes an embodiment of the invention;

FIGS. 2 (a) and (b) are explanatory diagrams for a description of an task input section and a task output section in a memory input/output device in the embodiment; and FIG. 3 is a block diagram showing the arrangement of a conventional multiple-task controller.

DETAILED DESCRIPTION OF THE PREFERRED EMBODIMENTS

One preferred embodiment of this invention will be described with reference to the accompanying drawings.

FIG. 1 shows a system including a multiple-task controller 10 according to the invention. The multiple-task controller 10 comprises: a task control section 11; a plurality of tasks 12a, 12b, 12c, . . . ; task memory input/output devices 13a, 13b, 13c, . . . provided for the tasks 12a, 12b, 12c, . . . , respectively; a serial input/output processing section 14; and a parallel input/output processing section 15. The multiple-task controller 10 is connected to a plurality of external devices 20a and 20b. General serial signals are transmitted between the first external device 20a and the multiple-task controller 10; while general parallel signals are transmitted between the second external device 20b and the multiple-task controller 10.

The serial input/output processing section 14 is electrically connected to the first external device 20a through a serial signal cable 21a. The parallel input/output processing section 15 is electrically connected to the second external device 20b through a parallel signal cable 21b.

The serial input/output processing section 14 is able to read data from or write data in the memory input/output devices 13a, 13b, 13c, . . . . The parallel input/output processing section 15 is also able to read data from or write data in the task memory input/output devices 13a, 13b, 13c, . . . . The memory input/output devices 13a, 13b, 13c, . . . are able to read data from or write data in the tasks 12a, 12b, 12c, . . . with the aid of the task control section 11. That is, the task control section 11 reads input signals from the memory input/output devices 13a, 13b, 13c, . . . , to apply commands to the tasks 12a, 12b, 12c, . . . . Furthermore, the task control section 11 reads the states of the tasks 12a, 12b, 12c, . . . and writes them in the memory input/output devices 13a, 13b, 13c, . . . .

FIG. 2 (a) and (b) are explanatory diagrams for a description of the arrangement of each of the memory input/output devices 13a, 13b, 13c, . . . .

The memory input/output devices 13a, 13b, 13c, . . . are equal in arrangement. Hence, the memory input/output device 13a will be described as a typical memory input/output device (13). The memory input/output device 13 comprises: a task input section $mS_{Ix}$ (where "m" represents "a", "b", "c" and so forth, being not shown in the drawing, and "x" represents bit "1", "2", "3" and so forth) for indicating the state of the task; and a task output section $mS_{Ox}$ (where, similarly, "m" represents "a", "b", "c" and so forth, being not shown in the drawing, and "x" represents bit "1", "2", "3" and so forth) for applying commands to the task.

In the task input section $mS_{Ix}$, "x" indicates a variety of contents. That is, when "x" is the first bit, then it means "kind of task"; when it is the second bit, then it means "automatic-operation possible state"; when it is the third, it means "system error"; when it is the fourth bit, then it means "task in operation"; when it is the fifth bit, it means "task cycle stop"; when it is the sixth bit, it means "task step stop"; when it is the seventh bit, it means "task hold stop"; and when it is the eighth bit, it means "empty". Similarly, in the task output section $mS_{Ox}$, "x" indicates a variety of contents. That is, when "x" is the first bit, then it means "error reset"; when it is the second bit, then it means "task initial start command"; when it is the third, it means "task continuation start command"; when it is the fourth bit, then it means "task step start command"; when it is the fifth bit, it means "task cycle stop command"; when it is the sixth bit, it means "task step stop command"; when it is the seventh bit, it means "task hold command"; and when it is the eighth bit, it means "empty".

The multiple-task controller designed as described above operates as follows:

It is assumed that the multiple-task controller 10 is in operation; that is, the task control section 11, the tasks 12a, 12b, 12c, . . . , the memory input/output devices 13a, 13b, 13c, . . . , the serial input/output processing section 14, and the parallel input/output processing section 15 are all active in operation. In addition, it is assumed that the first and second external devices 20a and 20b are also in operation.

Operation of the First External Device 20a

An input/output read/write command transmitted as a serial signal from the first external device 20a is applied to the serial input/output processing section 14, where it is processed. In the case where it is a write command, a writing operation is performed for a selected one (13) of the memory input/output devices 13a, 13b, 13c, . . . ; whereas in the case where it is a read command, a reading operation is performed for a selected one (13) of the memory input/output devices 13a, 13b, 13c, . . . .

For instance, in the case where the read/write command processed by the serial input/output processing section 14 is a write command for the memory input/output device 13a, the serial input/output processing section 14 operates to write the command in the task output section $aS_O$ of the memory input/output device 13a.

As a result, the task control section 11 detects that the state of the task output section $aS_O$ of the memory input/output device 13a has been changed, and reads the contents of the task output section $aS_O$ to apply to the task 12a a command according to the contents thus read. For instance when it is required to start the task 12a through the first external device 20a, the latter 20a outputs a general read/write command as a serial signal. In response to the general read/write command, the serial input/output processing section 14 operates to turn on the second bit of the task output section $aS_0$ of the memory input/output device 13a. As a result, the task 12a is started to perform its predetermined process.

In the same manner, the first external device 20a is able to control the remaining tasks 12b, 12c, ... respectively through the memory input/output devices 13b, 13c, ....

On the other hand, when for instance the state of the task 12a changes, then the task control section 11 detects it, and writes the change in the task input section $aS_I$ of the memory input/output device 13a. The contents thus written are read, as input/output state response, from the memory input/output device 13a, and applied, as a serial signal, to the first external device 20a through the serial input/output processing section 14 and the cable 21a.

Operation of the Second External Device 20b

An input/output read/write command transmitted, as a parallel signal, from the second external device 20b is applied to the parallel input/output processing section 15, where it is processed. In the case where it is a write command, a writing operation is performed for a selected one (13) of the memory input/output devices 13a, 13b, 13c, ... ; whereas in the case where it is a read command, a reading operation is performed for a selected one (13) of the memory input/output devices 13a, 13b, 13c, ....

For instance, in the case where the read/write command processed by the parallel input/output processing section 15 is a write command for the memory input/output device 13b, the parallel input/output processing section 15 operates to write the command in the task output section $bS_0$ of the memory input/output device 13b.

As a result, the task control section 11 detects that the state of the task output section $bS_0$ of the memory input/output device 13b has been changed, and reads the contents of the task output section $bS_0$ to apply to the task 12a a command according to the contents thus read. For instance when it is required to perform an error reset operation for the task 12b through the second external device 20b, the latter 20b applies a read/write command for "error reset", as a general parallel signal, to the parallel input/output processing section 15. In response to the general read/write command, the parallel input/output processing section 15 operates to turn on the first bit of the task output section $bS_0$ of the memory input/output device 13b. As a result, the error reset operation is carried out for the task 12a.

In the same manner, the second external device 20b can control the remaining tasks 12a, 12c, ... through the respective memory input/output devices 13a, 13c, ....

On the other hand, when for instance the state of the task 12b changes, then the task control section 11 detects it, and writes the change in the task input section $bS_I$ of the memory input/output device 13b. The contents thus written are read and applied to the second external device 20b through the parallel input/output processing section 15 and the cable 21b.

As was described above, in the embodiment, the tasks 12a, 12b, 12c, ... have the memory input/output devices 13a, 13b, 13c, ..., respectively. Each of the first and second external devices 20a and 20b is able to use the memory input/output devices 13a, 13b, 13c, ... to apply commands to the tasks 12a, 12b, 12c, ... and to read the states of the latter 12a, 12b, 12c, ..... Thus, with the embodiment, the controlling of the tasks 12a, 12b, 12c, ..., such as the starting and stopping of the latter, can be achieved readily as in the case where signal exchange is performed through input/output means. Thus, the embodiment corresponds to a controller in which one device is assigned to the tasks 12a, 12b, 12c, ....

In the multiple-task controller of the invention, the plurality of task memory input/output devices are assigned to the plurality of tasks, respectively, and each of the external devices is able to use the task memory input/output devices to apply commands to the tasks and to read the states of process of the latter. Therefore, the controlling of the tasks, such as the starting and stopping of the latter, can be achieved readily as in the case where signal exchange is performed through input/output means.

In the controller of the invention, the results of the reading and writing operation with respect to the task memory input/output devices provided respectively for the tasks, being controlled by the task control section, are applied to the tasks. Therefore, the controlling of the tasks, such as the starting and stopping of the latter, can be achieved readily as in the case where signal exchange is performed through input/output means. Furthermore, the controller of the invention functions as in a controller in which one external device is provided for each task.

In the controller of the invention, writing data in the task output sections, and reading data from the task input sections can be achieved with respect to the input/output processing sections as in the case where data are written and read through ordinary input/output means. Hence, any one can understand the operation of the multiple-task controller without knowledge of the computer, and are able to operate the controller as required.

What is claimed is:

1. A multiple-task controller comprising:

a plurality of tasks controlled by external devices;

a plurality of task memory input/output devices provided respectively for said tasks;

input/output processing device for processing signals transmitted between said external devices and said input/output processing device, and for performing writing and reading operations between said input/output processing device and said task memory input/output devices; and a task control device for applying commands written in said task memory input/output devices respectively to said tasks, and for applying the states of process of said tasks respectively to said task memory input/output devices.

2. A multiple-task controller as claimed in claim 1, wherein each of said task memory input/output devices includes:

a task output section having bits to which predetermined control commands are assigned, for controlling a respective one of said plurality of tasks; and a task input section having bits to which predetermined state signals are assigned, for detecting the states of the respective task.

3. A multiple-task controller as claimed in claim 2, wherein said bits to which predetermined control commands are assigned comprise:

a first bit which represents an error reset command;

a second bit which represents a task initial start command;

a third bit which represents a task continuation start command;

a fourth bit which represents a task step start command;

a fifth bit which represents a task cycle stop command;

a sixth bit which represents a task step stop command; and a seventh output bit which represents a task hold command.

4. A multiple-task controller as claimed in claim 2, wherein said bits to which predetermined state signals are assigned comprise:

a first bit which represents a kind of task;

a second bit which represents an automatic-operation possible state;

a third bit which represents a system error state;

a fourth bit which represents a task being in an operation state;

a fifth bit which represents a task cycle stop state;

a sixth bit which represents a task step stop state; and a seventh bit which represents a task hold stop state.

* * * * *